United States Patent
Park et al.

(10) Patent No.: US 9,804,662 B2
(45) Date of Patent: Oct. 31, 2017

(54) DISPLAY APPARATUS AND CONTROL METHOD FOR ENTERING PRE-POWER-ON MODE IN STANDBY MODE

(71) Applicant: SAMSUNG ELECTRONICS CO., LTD., Suwon-si, Gyeonggi-do (KR)

(72) Inventors: Hyo-sung Park, Suwon-si (KR); Kyung-min Kang, Suwon-si (KR); Seung-jun Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 13 days.

(21) Appl. No.: 14/882,708

(22) Filed: Oct. 14, 2015

(65) Prior Publication Data
US 2016/0103477 A1    Apr. 14, 2016

(30) Foreign Application Priority Data
Oct. 14, 2014   (KR) .................. 10-2014-0138459

(51) Int. Cl.
*G06F 1/32* (2006.01)
*G06F 9/44* (2006.01)

(52) U.S. Cl.
CPC .......... *G06F 1/3265* (2013.01); *G06F 1/3203* (2013.01); *G06F 9/4418* (2013.01)

(58) Field of Classification Search
CPC .............................. G06F 1/3265; G06F 9/4418
See application file for complete search history.

(56) References Cited

U.S. PATENT DOCUMENTS

| | | | |
|---|---|---|---|
| 2005/0168372 A1* | 8/2005 | Hollemans | G08C 17/02 341/176 |
| 2012/0278603 A1* | 11/2012 | Lee | G06F 9/4418 713/2 |
| 2012/0320280 A1* | 12/2012 | Waites | H04N 21/4436 348/730 |
| 2014/0139741 A1* | 5/2014 | Momosaki | H04N 21/4424 348/553 |

* cited by examiner

*Primary Examiner* — Albert Wang
(74) *Attorney, Agent, or Firm* — Nixon & Vanderhye P.C.

(57) ABSTRACT

A display apparatus and a controlling method thereof are provided. The controlling method of a display apparatus according to an exemplary embodiment includes, in response to a power-off command being input, storing information regarding an application which is executed at the time when the power-off command is input and entering a standby mode, and in response to a user interaction being detected while the display apparatus maintains a standby mode, entering a pre-power on mode where power is applied to an element included in the display apparatus by performing kernel-level booting.

10 Claims, 12 Drawing Sheets

DISPLAY APPARATUS AND CONTROL METHOD FOR ENTERING PRE-POWER-ON MODE IN STANDBY MODE

CROSS-REFERENCE TO RELATED APPLICATIONS

This application is based upon and claims priority under 35 U.S.C. §119 to Korean Patent Application No. 10-2014-0138459, filed in the Korean Intellectual Property Office on Oct. 14, 2014, the disclosure of which is incorporated herein by reference in its entirety.

BACKGROUND

1. Field

Aspects of the exemplary embodiments relate to a display apparatus and a controlling method thereof, and more particularly, to a display apparatus which may reduce a booting time of the display apparatus and a controlling method thereof.

2. Description of the Related Art

Recently, various technologies for fast booting of a display apparatus have been introduced, and the number of such technologies is increasing.

General booting refers to the operation of turning off and then turning on the power to operate various application programs of a system while a normal operating system is booted and executed.

Meanwhile, recent electronic devices may use various types of standby mode such as a suspend to RAM mode and an instant on mode which allow transition to an initialized state where the functions of a system can be executed within a few seconds after the system is turned on.

Meanwhile, a display apparatus may also use a mode where an interaction of a user who wishes to use the display apparatus is detected, preliminary booting is performed by applying power to hardware elements of the display apparatus in advance, and booting is performed immediately when a power-on command is input.

However, a problem occurs if the above-described standby mode and the mode for performing a preliminary booting are used at the same time. For example, when a user interaction is detected, instant booting where the application programs which have been executed prior to turning off power are preserved is performed and thus, an application is executed in the display apparatus even before applying power to a display panel, which may result in not appropriately displaying the application in a state when power was turned off.

SUMMARY

An aspect of the exemplary embodiments relates to a display apparatus which reduces a booting time by using a standby mode function and a pre-power on function efficiently, and a controlling method thereof.

According to an exemplary embodiment, there is provided a controlling method of a display apparatus including, in response to receiving a power-off command, storing information regarding an application which is being executed at the time when the power-off command is received and entering a standby mode, and in response to detection of a user interaction while the display apparatus is in a standby mode, entering a pre-power on mode where power is applied to an element included in the display apparatus by performing kernel-level booting.

The method may further include, in response to a power-on command received while the display apparatus maintains a pre-power on mode, entering a power-on mode by executing an application based on information regarding an application which was being executed at the time when the power-off command is received.

The method may further include, in response to a power-on command not being received within a critical time while the display apparatus maintains a pre-power on mode, reentering the standby mode by turning off power of an element included in the display apparatus.

User interaction may include, for example, at least one of gripping a control apparatus, moving the control apparatus, a user approaching to the control apparatus, and a user touching with respect to the control apparatus in order to control the display apparatus.

Entering a standby mode may include storing information in a volatile memory regarding the application which is executed at the time when the power-off command is received, and turning off power regarding an element except the volatile memory and a sub controller which controls the display apparatus in the standby mode.

The pre-power on mode may be a mode where power is applied to the element including a kernel and a kernel drive of the display apparatus which is turned off in the standby mode, and in which the application is not executed.

Entering a standby mode may include, in response to the application being a video play application, storing information regarding a video played by the video play application at the time when the power-off command is received and information regarding a point of time of playing the video and entering the standby mode, and entering a pre-power on mode may include applying power to an element included in the display apparatus and not executing the video application.

According to an exemplary embodiment, there is provided a display apparatus including an input unit configured to receive a user command, a detector configured to detect a user interaction, a storage, and a controller configured to control the display apparatus to store information in the storage regarding an application that is executed at the time when a power-off command is received, in response to a power-off command being received, and enter a standby mode, and to control the display apparatus to enter a pre-power on mode where power is applied to an element included in the display apparatus in response to a user interaction being detected through the detector while the display apparatus maintains a standby mode.

The controller may control the display apparatus to enter a power-on mode by executing an application based on information regarding an application that was being executed at the time when the power-off command was received, in response to a power-on command received while the display apparatus is in a pre-power on mode.

The controller may control the display apparatus to reenter the standby mode by turning off power of an element included in the display apparatus in response to a power-on command not being received within a critical time while the display apparatus is in a pre-power on mode.

User interaction may include at least one of gripping a control apparatus, moving the control apparatus, a user approaching the control apparatus, and a user touching with respect to the control apparatus in order to control the display apparatus.

The storage may further include a volatile memory, and the controller may further include a sub controller configured to control the display apparatus in the standby mode, and the sub controller may store information regarding the application which is being executed at the time when the power-off command is input in a volatile memory, and turn off power regarding an element except the volatile memory and the sub controller.

The pre-power on mode may be a mode where power is applied to the element including a kernel and a kernel drive of the display apparatus which is turned off in the standby mode, and the application is not executed.

The controller, in response to the application being a video play application, may control the display apparatus to store information regarding a video played by the video play application at the time when the power-off command is received and information regarding a point of time of playing the video and enter the standby mode, and in response to the user interaction being detected while the display apparatus is in a standby mode, may control the display apparatus to apply power to an element included in the display apparatus and not to execute the video application.

According to the various exemplary embodiments, a user may turn on a display apparatus quickly.

BRIEF DESCRIPTION OF THE DRAWINGS

The above and/or other aspects of the present inventive concept will be more apparent by describing certain exemplary embodiments of the present inventive concept with reference to the accompanying drawings, in which like reference numerals refer to like elements, and wherein.

DETAILED DESCRIPTION

The exemplary embodiments may vary, and may be provided in different exemplary embodiments. Specific exemplary embodiments will be described with reference to accompanying drawings and detailed explanation. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the embodiments, the specific description is omitted.

In the present disclosure, relational terms such as first and second, and the like, may be used to distinguish one entity from another entity, without necessarily implying any actual relationship or order between such entities.

The terms used in the following description are provided to explain a specific exemplary embodiment and are not intended to limit the scope of rights. A singular term includes a plural form unless it is intentionally written that way. The terms, "include", "comprise", "is configured to", etc. of the description are used to indicate that there are features, numbers, steps, operations, elements, parts or combinations thereof, and they should not exclude the possibilities of combination or addition of one or more features, numbers, steps, operations, elements, parts or combination thereof.

In an exemplary embodiment, 'a module' or 'a unit' performs at least one function or operation, and may be realized as hardware, software, or any combination thereof. In addition, a plurality of 'modules' or a plurality of 'units' may be integrated into at least one module and may be realized as at least one processor (not shown) except for 'modules' or 'units' that should be realized in a specific hardware.

Figure 1A:
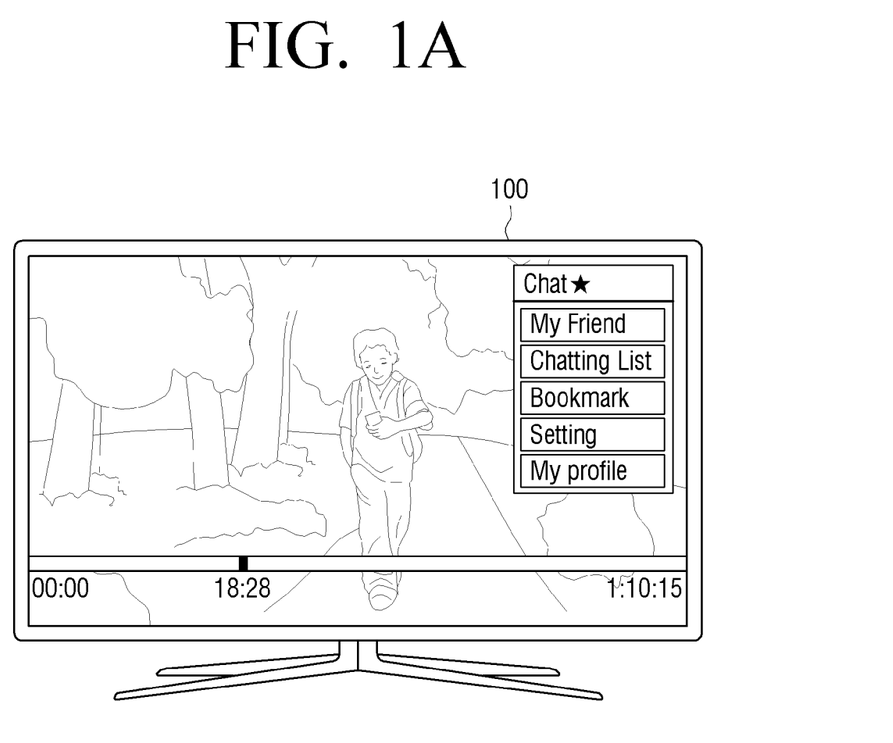
FIGS. 1A to 1C are views provided to explain a standby mode according to an exemplary embodiment.
Figure 1B:
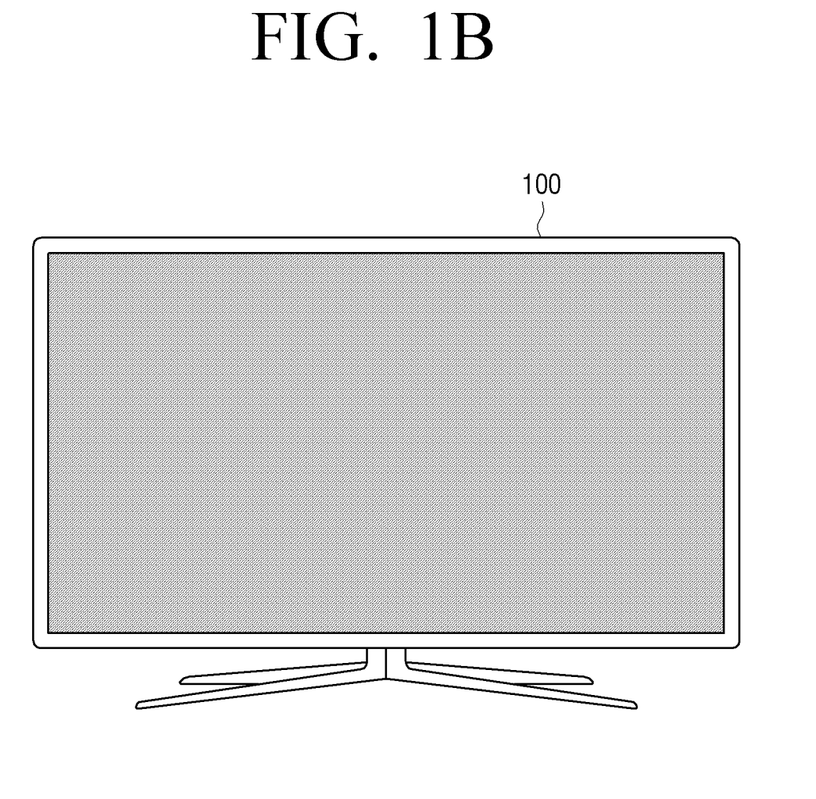
Figure 1C:
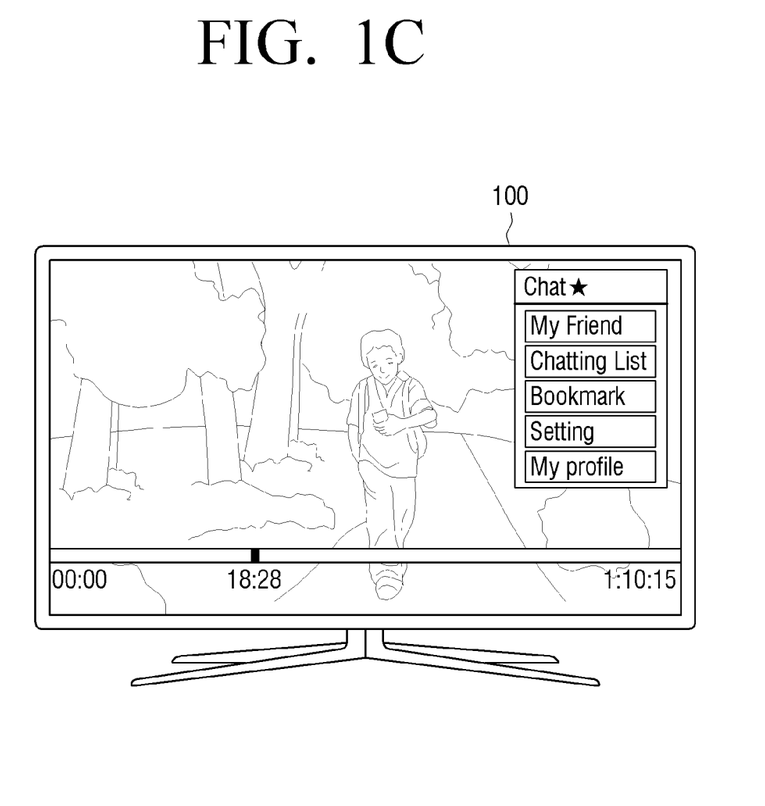

FIGS. 1A to 1C are views to explain a standby mode.

Specifically, FIG. 1A is a view illustrating that a display apparatus 100 executes a video play application and accordingly, a video is played according to an exemplary embodiment. According to this view, a user is watching an image content which has the play time of 1 hour 10 minutes and 15 seconds while executing a chatting application using the display apparatus 100.

If a user command to turn off the power of the display apparatus 100 is input while an application is being executed, the display apparatus 100 may store information regarding the application and turn off the power of an element such as a CPU to enter a standby mode.

In other words, the display apparatus 100 may store, in a volatile memory such as a DRAM, the state of hardware at the time when the power of the display apparatus 100 is turned off to use a standby mode such as a suspend to RAM mode or a suspend to DISK mode. Accordingly, the display apparatus 100 may preserve the contents stored in a volatile memory such as a DRAM by using a self-refresh operation of a DDR memory in a suspend state. If a user command to turn on the power of the display apparatus 100 is input, the operation state prior to turning off the power may be preserved swiftly.

FIG. 1B is a view illustrating the display apparatus 100 after a user command to turn off the power of the display apparatus 100 is input. The display apparatus 100 which enters a standby mode may appear to be the same as the display apparatus 100 of which power is turned off.

FIG. 1C is a view illustrating the display apparatus 100 when a user command to turn on the power of the display apparatus 100 is input again while the display apparatus is in a standby mode. When a power-on command is input, the display apparatus 100 may perform suspend booting or instant booting where booting is performed while preserving the execution state prior to turning off the power.

Accordingly, as illustrated in FIG. 1C, the display apparatus 100 may turn on the power while preserving the state prior to turning off the power. In other words, a user may watch an image content which he or she had been watching before the power was turned off continuously from the part which was played when the power was turned off. The display apparatus 100 which is booted in a standby mode may execute all applications which had been executed when the power was turned off. Accordingly, at the time of booting, the display apparatus 100 may also execute and display a chatting application which has been executed simultaneously with a video play application.

According to the above-described standby mode, a user may restore the previous operation state of the display apparatus 100 before it was turned off and also use the display apparatus 100 of which booting time is shortened.

Figure 2:
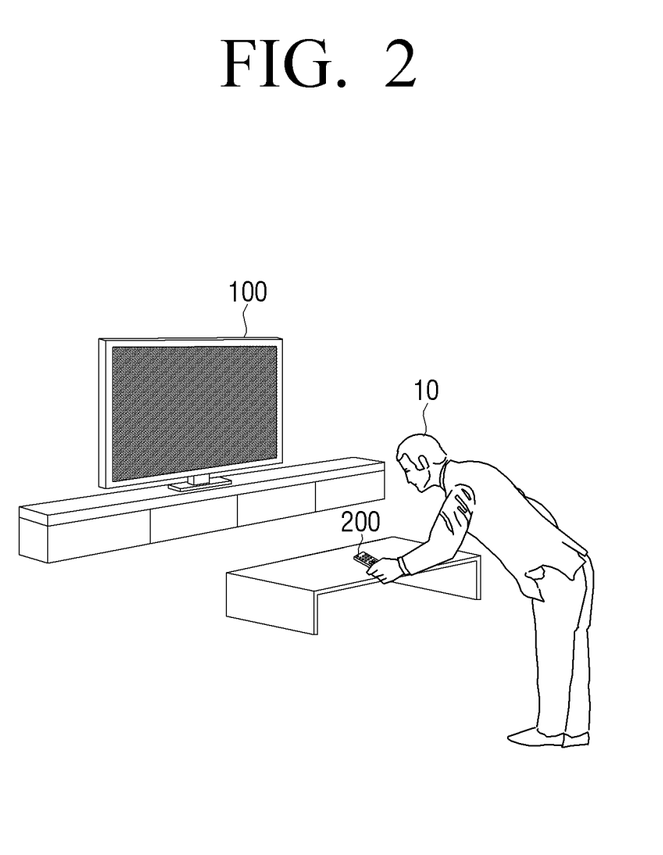
FIG. 2 is a view provided to explain a pre-power on mode according to an exemplary embodiment.

Meanwhile, FIG. 2 is a view provided to explain a preliminary booting according to an exemplary embodiment. The display apparatus 100 where power of a display panel is turned off as its power is turned off or as it has entered a standby mode may perform preliminary booting when a user, user's intention or a user interaction to use the display apparatus 100 is detected.

In other words, the display apparatus 100 may perform booting in a similar way when a user command to turn on power is input. However, the display apparatus 100 which performs preliminary booting may not apply power to a display panel. Accordingly, when a command to press a power button on a remote controller is input by a user, the display apparatus 100 may provide power to a display panel immediately to complete booting as it has already performed the operation of resuming a kernel and a kernel drive. The kernel may be, for example, an operating system (OS) to drive the display apparatus 100. The kernel drive may be, for example, an apparatus included in the display apparatus 100, such as an audio output unit, a display panel or a tuner, or the like.

If a power-on command is input while the display apparatus 100 performs preliminary booting, the display apparatus 100 may perform the booting continuously. If a power-on command is not input after the display apparatus 100 has completed the preliminary booting, the display apparatus 100 may wait for a user command without applying power to the display panel.

Accordingly, as the display apparatus 100 performs preliminary booting such as resuming a kernel and a kernel drive from when a user, user's intention, or a user interaction to use the display apparatus 100 is detected and applies power to a display panel when a power-on command is input, the user may feel that the display apparatus 100 is booted as soon as a power-on button is pressed.

Hereinafter, detecting a user interaction refers to detecting a user, user's intention, or a user interaction through the display apparatus 100, a separate control apparatus such as a remote controller to control the display apparatus 100, a mobile phone such as a smart phone, etc. In other words, the user interaction is considered to have broader concept including a user, user's intention, etc.

Figure 3:
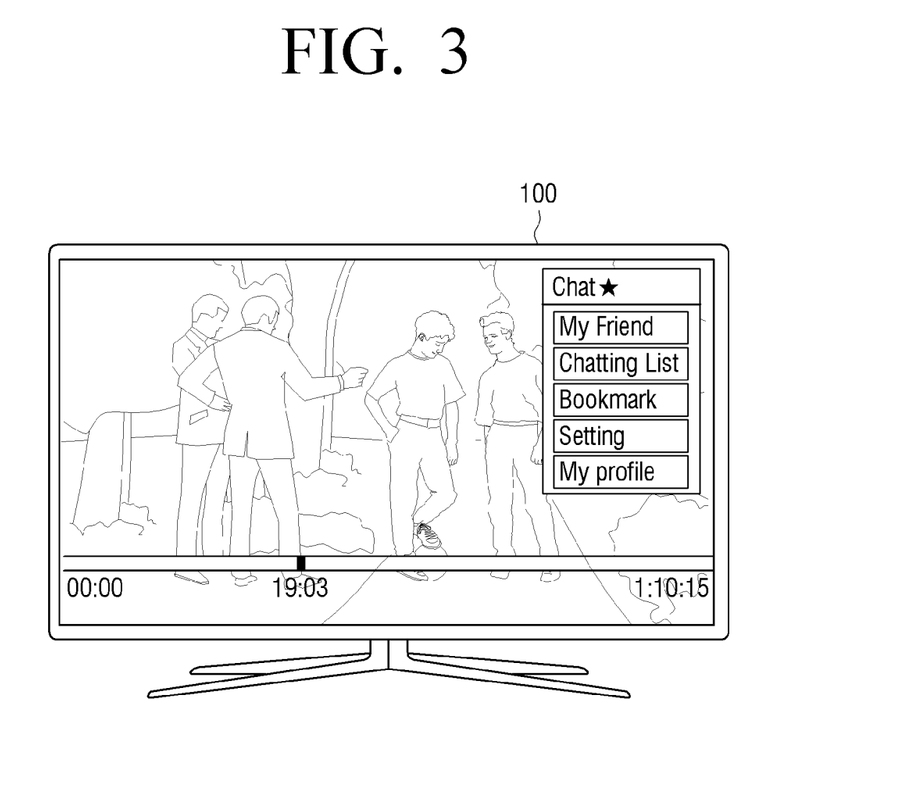
FIG. 3 is a view provided to explain a problem which may occur when a standby mode and a pre-power on mode are applied at the same time.

Meanwhile, FIG. 3 is a view provided to explain a problem which may occur when the preliminary booting which has been described above with reference to FIG. 2 is performed in the display apparatus 100 which enters the standby mode which has been described above through FIGS. 1A to 1C.

As illustrated in FIG. 1A, if the display apparatus 100 which has been executing an application enters a standby mode using the above-described method and then, detects a user interaction, the display apparatus 100 may perform preliminary booting.

In other words, the display apparatus 100 may resume a kernel and a kernel drive before a power-on command is input, and execute a video play application and a chatting application as illustrated in FIG. 1A.

However, the display apparatus 100 for which preliminary booting has been performed does not apply power to a display panel. Thus, if the preliminary booting is performed but a power-on command is not input immediately, the display apparatus 100 may perform a video play application as illustrated in FIG. 1A and play a video from the part which was played when power was turned off. In other words, the display apparatus 100 may play a video from the part which was played when power was turned off even if power is not provided to the display panel.

Accordingly, as illustrated in FIG. 1, if the preliminary booting is performed and then, a power-on command is input from a user after a predetermined time elapses, the display apparatus 100 may appear to play an image content from the part which was played after a predetermined time elapses from the part which had been played at the time of power being turned off as illustrated in FIG. 1A. Thus, a user watches the image content from the part which comes when the time for completing the preliminary booting and for inputting the power-on command elapses.

Subsequently, the user may feel that the booting time of the display apparatus 100 is short, but may not realize the execution state of the display apparatus 100 when it was turned off.

Hereinafter, the display apparatus 100 which may make use of the original advantages of a standby mode such as a suspend to RAM mode while reducing the booting time by resolving the above problem will be described with reference to FIG. 4.

Figure 4:
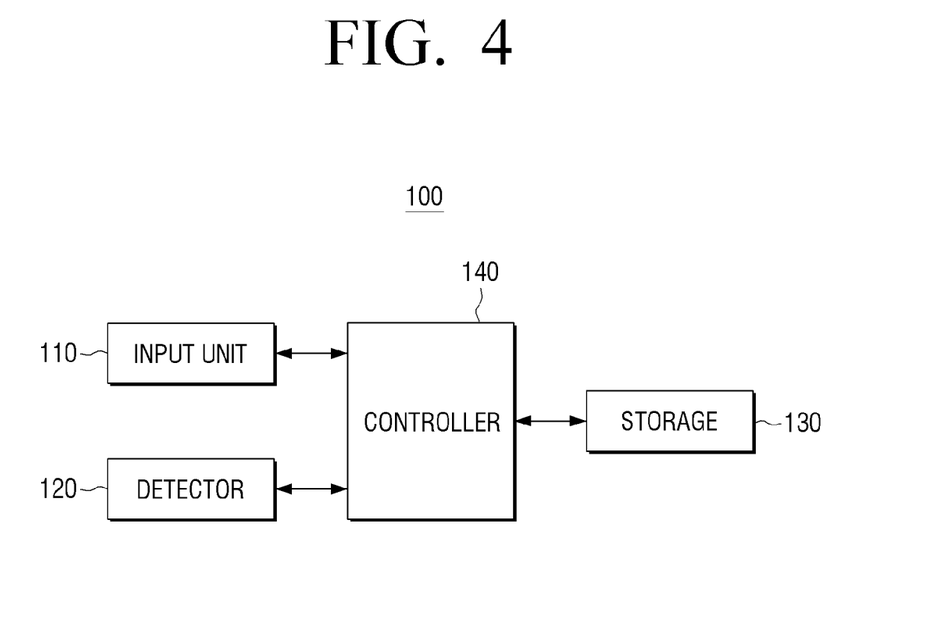
FIG. 4 is a block diagram illustrating configuration of a display apparatus according to an exemplary embodiment.

FIG. 4 is a block diagram illustrating configuration of the display apparatus 100 according to an exemplary embodiment. As illustrated in FIG. 4, the display apparatus 100 may include an input unit 110, a detector 120, a storage 130, and a controller 140. In this case, the display apparatus may be, for example, and without limitation, a TV. The display apparatus 100 may, for example, be realized as various electronic apparatuses with a display, such as mobile phone, tablet PC, digital camera, camcorder, notebook PC, PDA, etc.

The input unit 110 receives a user command. The input unit 110 receives a user command to control overall operations of the display apparatus 100. In particular, the input unit 110 may receive a user command to turn on/off the power of the display apparatus 100.

In this case, the input unit 110 may, for example, be realized as a remote controller including four directions keys in the up, down, left, and right directions and a confirmation key. The input unit 110 may, for example, be realized as various input apparatuses such as touch screen, mouse, pointing device, etc.

The detector 120 detects a user interaction. In particular, the detector 120 may detect a user interaction regarding a control apparatus 200 to control the display apparatus 100. Specifically, the detector 120 may detect a user interaction such as, for example, gripping of the control apparatus 200, moving of the control apparatus 200, a user's approaching to the control apparatus 200, and a user's touch with respect to the control apparatus 200.

In addition, the detector 120 may receive information regarding a user interaction which is detected directly by the control apparatus 200. For example, the detector 120 may receive information regarding a user interaction which is detected directly by the control apparatus 200 using various methods such as WiFi and Bluetooth.

Meanwhile, the storage 130 stores various modules to drive the display apparatus 100. For example, the storage 130 may store software including a base module, a sensing module, a communication module, a presentation module, a web browser module, and a service module. In this case, the base module refers to a basic module which processes a signal transmitted from each hardware included in the display apparatus 100, and transmits the processed signal to an upper layer module. The sensing module is a module which collects information from various sensors, and analyzes and manages the collected information. The sensing module may include a face recognition module, a voice recognition module, a motion recognition module, and an NFC recognition module, and so on. The presentation module is a module to compose a display screen. The presentation module may include a multimedia module for reproducing and outputting multimedia contents, and a UI rendering module for UI and graphic processing. The communication module is a module to perform communication with outside. The service module is a module including various applications for providing various services.

As described above, the storage 130 may include various program modules, but some of the various program modules may be omitted or changed, or new modules may be added according to the type and characteristics of the display apparatus 100. For example, if the display apparatus 100 is realized as a smart phone, the base module may, for example, further include a location determination module to determine a GPS-based location, and the sensing module may, for example, further include a sensing module to detect a user's operation.

Meanwhile, if a user command to turn off the power of the display apparatus 100 is input through the input unit 110, the storage 130 may store the operation state of the display apparatus 100.

In other words, the display apparatus 100 may store the state of a hardware drive at the time when the power of the display apparatus 100 is turned off in a volatile memory of the storage 130, such as a DRAM and thus, use a standby mode such as a suspend to RAM or a suspend to DISK. Accordingly, the display apparatus 100 may preserve the contents stored in a volatile memory such as a DRAM by using a self-refresh operation of a DDR memory of the storage 130 in a suspend state. If a user command to turn on the power of the display apparatus 100 is input from a user, the display apparatus 100 may preserve the operation state prior to turning off the power quickly.

The controller 140 controls the overall operations of the display apparatus 100 using various programs stored in the storage 130. In particular, if a power-off command is input through the input unit 110, the controller 140 may control the display apparatus to store information regarding an application which is executed at the time when the power-off command is input in the storage 130 and enter a standby mode. Specifically, the controller 140 may, for example, store information regarding an application which is executed when the power-off command is input in a volatile memory, and turn off the power off all elements except the volatile memory and some elements necessary to control the display apparatus 100 in the standby mode.

In addition, if a user interaction is detected through the detector 120 while the display apparatus 100 maintains the standby mode, the controller 140 may control the display apparatus to enter a pre-power on mode where power is applied all elements included in the display apparatus 100 except a display.

The controller 140 may include a sub controller (not illustrated). The sub controller is an element that may control the display apparatus 100 when the display apparatus 100 enters a standby mode. Accordingly, the display apparatus 100 may enter the pre-power on mode in the standby mode under the control of the sub controller.

The pre-power on mode may refer to a state where a kernel and a kernel drive of the display apparatus 100 are resumed. The kernel may be an operating system (OS) to drive the display apparatus 100. The kernel drive may be an apparatus included in a panel such as, for example, an audio output unit and the display 110 or an apparatus included in the display apparatus such as, for example, a tuner. Accordingly, the pre-power on mode may refer to a state where an application is not executed while the operating system to drive the display apparatus 100 is resumed and elements included in the display apparatus 100, excluding a display, are resumed.

In addition, the pre-power on mode may also refer to a state where power is applied only to hardware elements, excluding a display of the display apparatus 100. In other words, the pre-power on mode may refer to a state where only kernel-level booting is performed by applying power with respect to hardware, and user-level booting is not performed.

Consequently, the pre-power on mode refers to a state where the display apparatus 100 has completed the preparation for executing a user application, but before the user application is executed. However, power is not applied to a display in the pre-power on mode and thus, a user may believe that the pre-power on mode is the same as the power-off state based on the appearance.

If a power-on command is input while the display apparatus 100 maintains the pre-power on mode, the controller 140 may control the display apparatus to enter a power-on mode by executing an application based on the information regarding the application which had been executed at the time when the power-off command was input.

If a power-on command is not input within a predetermined time while the display apparatus 100 maintains the pre-power on mode, the controller 140 may control the display apparatus to enter a standby mode again by turning off power of the elements included in the display apparatus 100.

Specifically, if a power-off command is input while the display apparatus 100 is executing a video play application, the controller 140 may control to store information regarding a video which has been played in the video play application at the time when the power-off command is input and information regarding the video play time, and enter a standby mode. If a user interaction is detected through the detector 120 while the display apparatus maintains the standby mode, the controller 140 may control to apply power to elements included in the display apparatus but not to execute an application. In other words, the controller 140 may control the display apparatus 100 to enter the pre-power on mode.

As described above, according to the display apparatus 100, a user may still use the execution state when power was turned off without having to wait for the booting of the display apparatus 100 for a long time.

Figure 5:
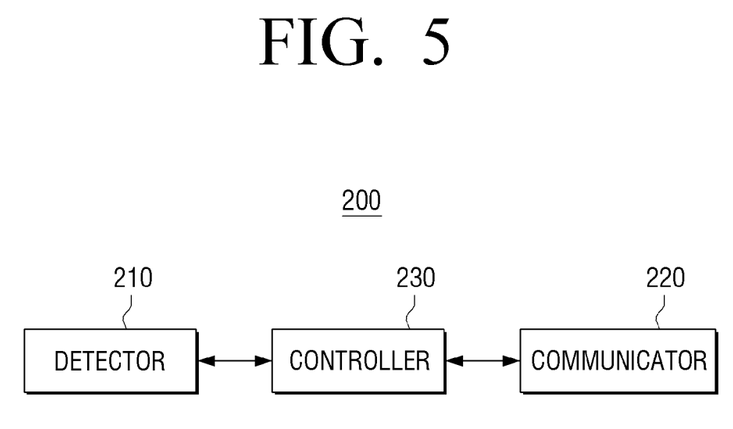
FIG. 5 is a block diagram illustrating configuration of a control apparatus according to an exemplary embodiment.

Hereinafter, the control apparatus 200 to control the display apparatus 100 will be described with reference to FIG. 5. As illustrated in FIG. 5, the control apparatus 200 may include a detector 210, a communicator 220, and a controller 230. The control apparatus 200 may, for example, be a remote controller which is provided separately in order to control the display apparatus 100. The control apparatus 200 may be various electronic apparatuses which may control the display apparatus 100.

The detector 210 detects a user interaction. The user interaction may, for example, include gripping the control apparatus 200, moving the control apparatus 200, a user approaching to the control apparatus 200, and a user touching with respect to the control apparatus 200.

The detector 210 may include various types of sensors to detect a user interaction. Specifically, the detector 210 may detect a user's approach or a touch interaction using, for example, a proximity sensor or a touch sensor. In addition, the detector 210 may include, for example, an acceleration sensor, a gyro sensor, or a gravity sensor, and detect a user's motion of gripping, manipulating or moving the control apparatus 200.

Meanwhile, the communicator 220 performs communication with the display apparatus 100. If a user command to control the display apparatus 100 is input, the communicator 220 may transmit the input user command to the display apparatus 100. In particular, the communicator 220 may transmit information corresponding to the user interaction detected through the detector 210 to the display apparatus 100.

The controller 230 controls the overall operations of the control apparatus 200. In particular, the controller 230 may control the control apparatus to detect a user interaction using at least one sensor included in the detector 210. The controller 230 may control the control apparatus to transmit a user command to control the display apparatus 100 to the display apparatus 100. In particular, the controller 230 may transmit information corresponding to a detected user interaction to the display apparatus 100 through the communicator 220.

As described above, by using the control apparatus 200 capable of detecting a user interaction, the display apparatus 100 may detect a user interaction for using the display apparatus 100.

Figure 6A:
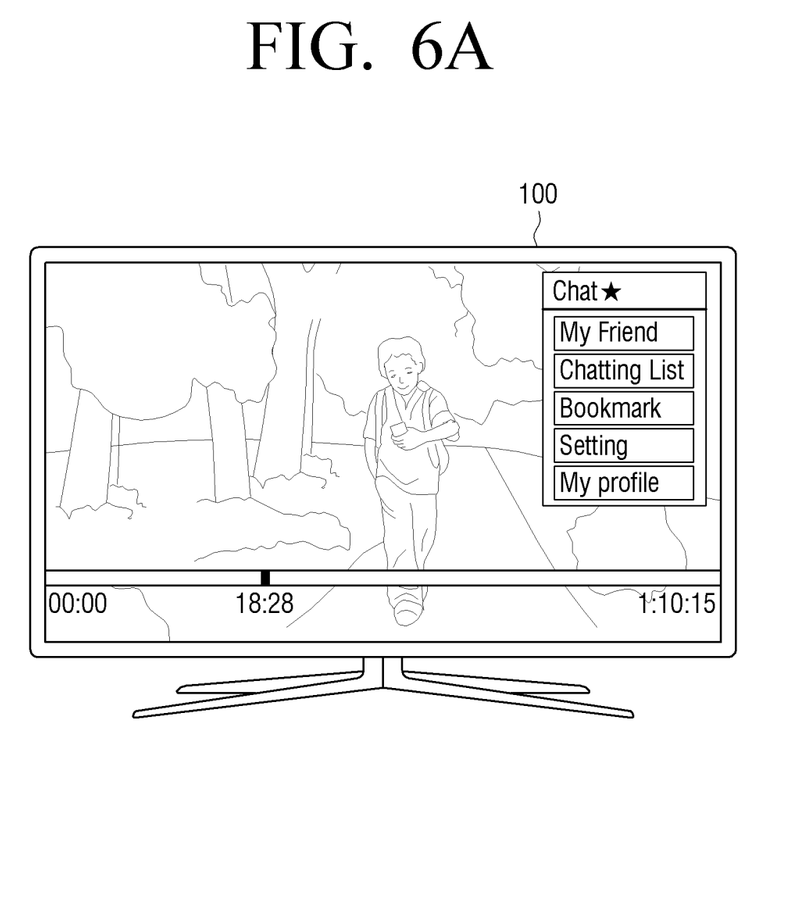
FIGS. 6A to 6C are views provided to explain power on/off of a display apparatus according to an exemplary embodiment.
Figure 6B:
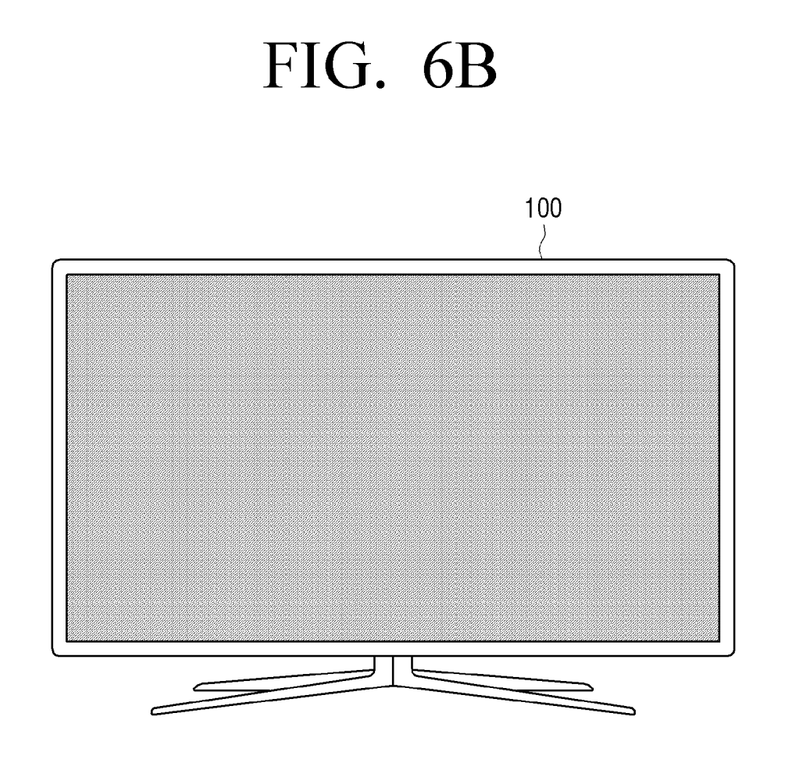
Figure 6C:
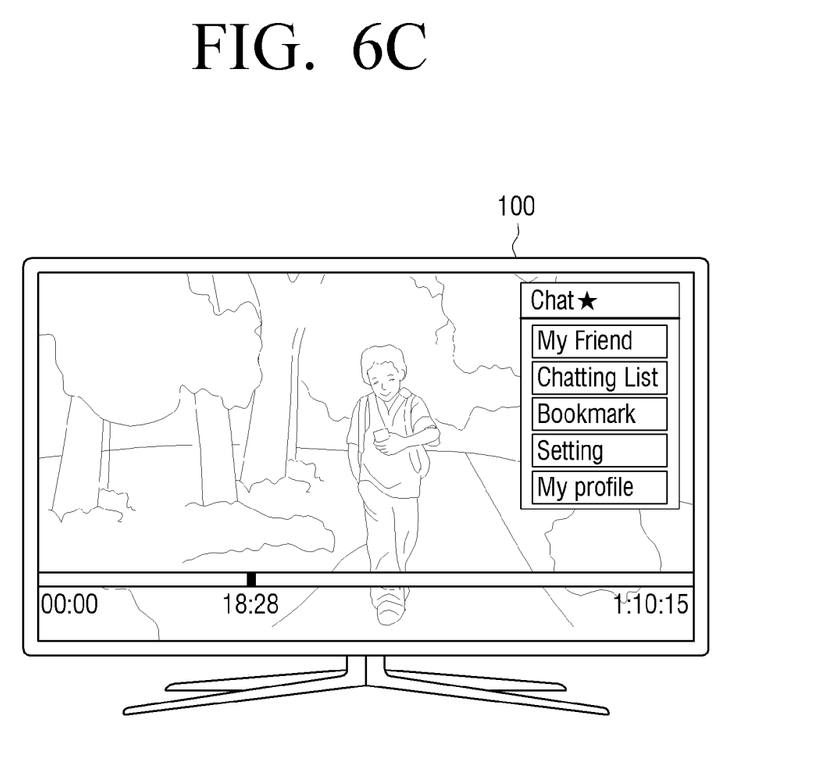

According to an exemplary embodiment, if a power-on/off command is input by the display apparatus 100, the execution of an application prior to turning off power may be preserved at a fast booting speed as illustrated in FIGS. 6A to 6C.

In other words, as illustrated in FIG. 6A, it is assumed that a user executes a video play application and a chatting application through the display apparatus 100 as illustrated in FIG. 6A. For example, in accordance with a user command, the display apparatus 100 displays an image content which lasts for 1 hour 10 minutes and 15 seconds and the executing screen of a chatting application.

As illustrated in FIG. 6A, if a power-off command is input through the input unit 110 when the play time of the image content marks 18 minutes and 28 seconds, the display apparatus 100 may store information regarding the execution application and enter a standby mode.

In other words, the display apparatus 100 may store information regarding the application which is being executed, the play time of an image content, information regarding the play environment which has been set, etc. in a volatile memory, and turn off power of all elements excluding the volatile memory and some elements including a sub memory to control the display apparatus 100.

As illustrated in FIG. 6B, almost every element including a speaker and a display panel of the display apparatus 100 which enters a standby mode is turned off and thus, it may appear to be the same as the display apparatus 100 of which power is turned off.

If a user interaction is detected during a standby mode, the display apparatus 100 may perform kernel-level booting to enter a pre-power on mode.

The user interaction may, for example, include all actions of a user, which are performed with an intention to use the display apparatus 100. In particular, the display apparatus 100 may detect a user interaction with respect to the control apparatus 200 through the detector 120. Specifically, the display apparatus 100 may detect a user interaction such as, for example, gripping of the control apparatus 200, moving of the control apparatus 200, a user's approaching to the control apparatus 200, and a user's touch with respect to the control apparatus 200.

Meanwhile, the pre-power on mode may refer to a state where a kernel and a kernel drive of the display apparatus 100 are resumed. The kernel may be an operating system (OS) to drive the display apparatus 100. The kernel drive may be an apparatus included in a panel such as an audio output unit and the display 110 or an apparatus included in the display apparatus such as a tuner. Accordingly, the pre-power on mode may refer to a state where an application is not executed while the operating system to drive the display apparatus 100 is resumed and elements in the display apparatus 100, excluding a display, are resumed.

In addition, the pre-power on mode may also refer to a state where power is applied only to hardware elements, excluding a display of the display apparatus 100. For example, the pre-power on mode may refer to a state where only kernel-level booting is performed by applying power with respect to hardware and user-level booting is not performed.

Consequently, the pre-power on mode refers to a state where the display apparatus 100 has completed the preparation for executing a user application, but before the user application is executed. However, power is not applied to a display in the pre-power on mode and thus, a user may believe that the pre-power on mode is the same as the power-off state based on the appearance.

Accordingly, if a user interaction of, for example, gripping the control apparatus 200 such as a remote controller is detected in a standby mode, the display apparatus 100 may enter the pre-power on mode where the preparation for executing an application is completed by applying power to elements including a kernel and a kernel drive of the display apparatus 100.

Meanwhile, the pre-power on mode is a stage prior to performing user-level booting such as executing an application and thus, it appears that a display panel of the display apparatus 100 is turned off as illustrated in FIG. 6B.

FIG. 6C is a view illustrating the display apparatus 100 when a power-on command is input while the pre-power on mode is maintained. In other words, when a power-on command is input in the pre-power on mode, the display apparatus 100 may apply power to a display panel and execute the application which had been executed when a power-off command was input based on the information stored in a volatile memory.

Accordingly, even if a power-on command is input after a predetermined time has elapsed in the pre-power on mode, the display apparatus 100 may preserve the execution state when the power was turned off as illustrated in FIG. 6C. In other words, as the pre-power on mode is a mode where booting is performed up to the stage just before executing an application, the display apparatus 100 may play an image content from the play time of the image content which had been played through a video play application.

Figure 7:
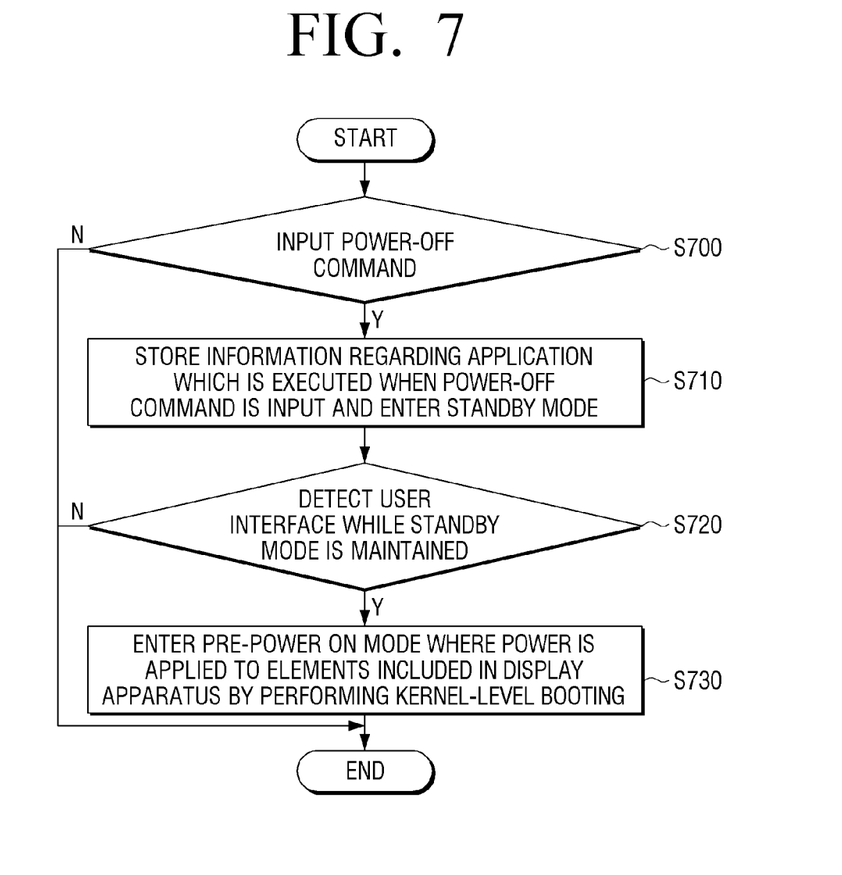
FIG. 7 is a flowchart illustrating a method of controlling a display apparatus according to an exemplary embodiment.

Meanwhile, FIG. 7 is a flowchart illustrating a controlling method of the display apparatus 100 according to an exemplary embodiment.

If a power-off command is input (S700-Y), the display apparatus 100 stores information regarding an application which is executed at a time when the power-off command is input and enters a standby mode (S710). Specifically, the display apparatus 100 may store information regarding an application which is executed at a time when the power-off command is input in a volatile memory, and turn off power of the volatile memory and all elements except some elements to control the display apparatus 100 in a standby mode.

If a user interaction is detected (S720-Y) while the standby mode is maintained, the display apparatus 100 may enter a pre-power on mode where power is applied to the elements included in the display apparatus 100 by performing kernel-level booting (S730).

The pre-power on mode may refer to a state where a kernel and a kernel drive of the display apparatus 100 are resumed. The kernel may be an operating system (OS) to drive the display apparatus 100. The kernel drive may be an apparatus included in a panel such as an audio output unit and the display 110 or an apparatus included in the display apparatus such as a tuner. Accordingly, the pre-power on mode may refer to a state where an application is not executed while the operating system to drive the display apparatus 100 is resumed and apparatuses included in the display apparatus 100 are resumed, but an application is not executed.

In addition, the pre-power on mode may also refer to a state where power is applied only to hardware elements of the display apparatus 100. In other words, the pre-power on mode may refer to a state where only kernel-level booting is performed by applying power with respect to hardware, and user-level booting is not performed.

Consequently, the pre-power on mode refers to a state where the display apparatus 100 has completed the preparation for executing a user application, but before the user application is executed.

Figure 8:
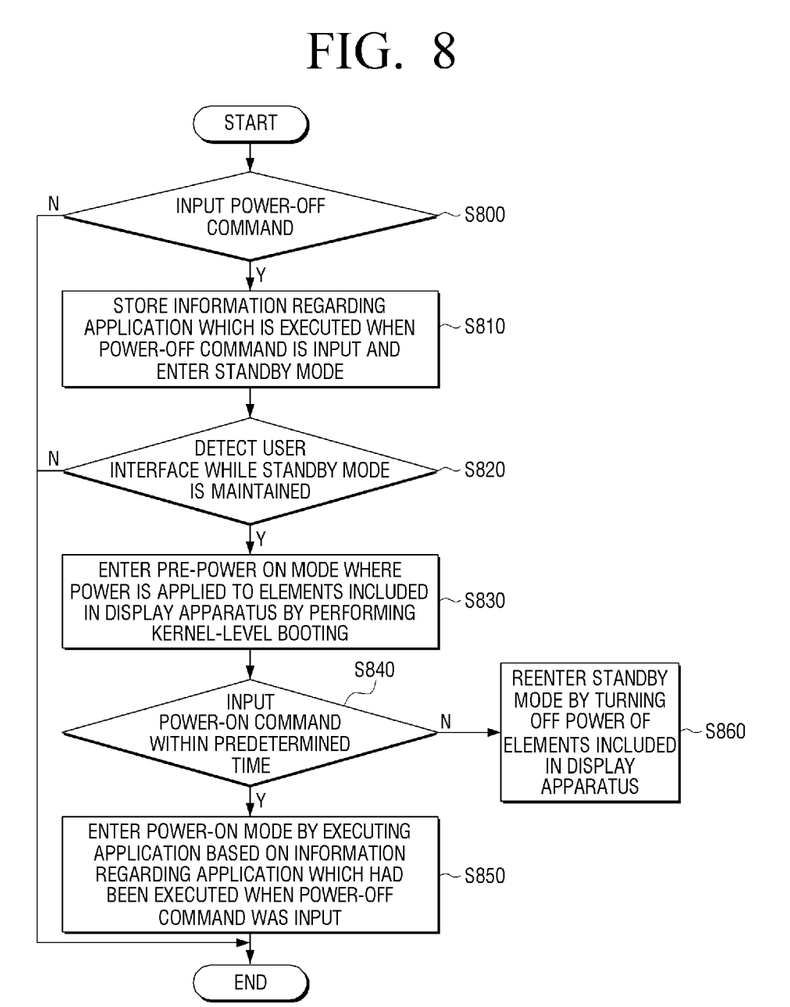
FIG. 8 is a flowchart illustrating a method of changing a mode in a display apparatus according to an exemplary embodiment.

Meanwhile, FIG. 8 is a flowchart provided to explain a controlling method of the display apparatus 100 in detail. First of all, as described above with reference to FIG. 7, if a power-off command is input (S800-Y), the display apparatus 100 stores information regarding an application which is executed at a time when the power-off command is input and enters a standby mode (S810). If a user interaction is detected (S820-Y) while the standby mode is maintained, the display apparatus 100 may enter a pre-power on mode where power is applied to the elements included in the display apparatus 100 by performing kernel-level booting (S830).

After entering the pre-power on mode, the display apparatus 100 determines whether a power-on command is input within a predetermined time (S840). In other words, if a power-on command is input (S840-Y) through an input unit formed on the display apparatus 100 or the control apparatus to control the display apparatus 100 within a predetermined time after entering the pre-power on mode, the display apparatus 100 enters a power-on mode by executing an application based on information regarding an application which had been executed when the power-off command was input (S850).

Specifically, if a power-on command is input within a predetermined time, the display apparatus 100 which enters the pre-power on mode may apply power to a display panel and execute a user application by perform user-level booting. For example, if a game application and an Internet application had been executed before power of the display apparatus 100 was turned off, the display apparatus which receives a power-on command may apply power to hardware elements including a display panel, which have not been resumed, and execute the game application and the Internet application based on the information regarding the applications stored in a volatile memory.

Meanwhile, if a power-on command is not input (S840-N) through an input unit formed on the display apparatus 100 or the control apparatus to control the display apparatus 100 within a predetermined time after entering the pre-power on mode, the display apparatus 100 reenters a standby mode by turning off the power of elements included in the display apparatus 100 (S860).

In other words, if a power-on command is not input within a predetermined time, the display apparatus 100 may determine that the detected user interaction is not to use the display apparatus 100. Accordingly, the display apparatus 100 may reenter a standby mode by turning off the power of elements of the resumed display apparatus 100.

Even after reentering a standby mode, the display apparatus 100 may enter the pre-power on mode using the above-described method when a user interaction is detected.

The controlling method of a display apparatus according to the above-described various exemplary embodiments may be coded as software and stored in a non-transitory readable medium which may be mounted and used in various apparatuses.

The non-transitory recordable medium refers to a medium which may store data semi-permanently rather than storing data for a short time, such as register, cache, memory, etc. and is readable by an apparatus. Specifically, the above-described various applications and programs may be stored and provided in a non-transitory recordable medium such as CD, DVD, hard disk, Blu-ray disk, USB, memory card, ROM, etc.

The foregoing embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling a display apparatus, the method comprising:
storing, in response to receiving a power-off command, information regarding an application which is being executed at a power off time of the display apparatus and entering a standby mode in which an element of the display apparatus is turned off; and
entering a pre-power on mode where power is applied to the element of the display apparatus in response to detection of a user interaction while the display apparatus is in a standby mode;
wherein the pre-power on mode is a mode in which the application is not executed until a power-on command is received.

2. The method as claimed in claim 1, further comprising:
reentering the standby mode by turning off power of the element included in the display apparatus in response to the power-on command not being received within a predetermined time while the display apparatus is in the pre-power on mode.

3. The method as claimed in claim 1, wherein detecting a user interaction includes at least one of detecting gripping of a control apparatus, detecting movement of the control apparatus, detecting a user approaching the control apparatus, and detecting a user touching the control apparatus in order to control the display apparatus.

4. The method as claimed in claim 1, wherein entering the standby mode comprises:
storing information in a volatile memory regarding the application which is being executed at the time when the power-off command is received; and turning off power to an element other than the volatile memory and a sub controller which controls the display apparatus in the standby mode.

5. The method as claimed in claim 1, wherein entering the standby mode comprises, in response to the application being a video play application, storing information regarding a video played by the video play application at the time when the power-off command is received and information regarding a point of time of playing the video and a point of time of entering the standby mode, wherein entering the pre-power on mode comprises applying power to the element included in the display apparatus and not executing the video application.

6. A display apparatus, comprising:
an input configured to receive a user command;
a detector configured to detect a user interaction;
a storage; and
a controller configured to control the display apparatus to store, in response to receiving a power-off command, information in the storage regarding an application that is being executed at a power off time of the display apparatus and to enter a standby mode in which an element of the display apparatus is turned off,
said controller being further configured to maintain the display apparatus in a standby mode in response to the user interaction being detected by the detector, and to control the display apparatus to enter a pre-power on mode where power is applied to the element of the display apparatus;
wherein the pre-power on mode is a mode in which the application is not executed until a power-on command is received.

7. The apparatus as claimed in claim 6, wherein the controller is configured to cause the display apparatus to reenter the standby mode by turning off power of the element included in the display apparatus in response to the power-on command not being input within a predetermined time while the display apparatus is in the pre-power on mode.

8. The apparatus as claimed in claim 6, wherein the user interaction includes at least one of gripping a control apparatus, moving the control apparatus, a user approaching the control apparatus, and a user touching the control apparatus.

9. The apparatus as claimed in claim 6, wherein the storage comprises:
a volatile memory,
wherein the controller further comprises: a sub controller configured to control the display apparatus in the standby mode, and wherein the sub controller is configured to store information in the volatile memory regarding the application which is being executed at the time when the power-off command is input, and turns off power to the element of the display apparatus except the volatile memory and the sub controller.

10. The apparatus as claimed in claim 6, wherein the controller is configured to control the display apparatus to store information regarding a video played by a video play application at the time the power-off command is received and information regarding a point of time of playing the video, and to enter the standby mode, in response to the application being a video play application, and to control the display apparatus to apply power to the element included in the display apparatus and to not execute the video application in response to the user interaction being detected while the display apparatus is in the standby mode.

* * * * *